US006132547A

United States Patent [19]
Marsh

[11] Patent Number: 6,132,547
[45] Date of Patent: Oct. 17, 2000

[54] TRANSFER PRINTING METHOD AND APPARATUS

[75] Inventor: Peter Leslie Marsh, Whitstable, United Kingdom

[73] Assignee: Elfglade Limited, Richmond, United Kingdom

[21] Appl. No.: 09/077,451

[22] PCT Filed: Dec. 2, 1996

[86] PCT No.: PCT/GB96/02979

§ 371 Date: May 29, 1998

§ 102(e) Date: May 29, 1998

[87] PCT Pub. No.: WO97/20101

PCT Pub. Date: Jun. 5, 1997

[30] Foreign Application Priority Data

Nov. 30, 1995 [GB] United Kingdom .................. 9524502

[51] Int. Cl.[7] .......................... B44C 1/165; B32B 31/00; B32B 4/00; B41M 3/12; B41M 3/00

[52] U.S. Cl. .......................... 156/230; 156/233; 156/234; 156/237; 156/240; 156/241; 156/247; 156/289; 428/195; 428/201; 428/204; 428/914; 101/492; 427/147

[58] Field of Search .................................... 156/230, 231, 156/233, 234, 235, 239, 240, 247, 277, 289, 275.1; 503/227; 427/195, 474.4, 500, 146, 147, 148; 101/211, 492; 428/914, 201, 204, 209, 212, 195

[56] References Cited

U.S. PATENT DOCUMENTS

| | | | |
|---|---|---|---|
| 4,984,517 | 1/1991 | Doublet | 101/470 |
| 5,679,616 | 10/1997 | Payne | 503/227 |

FOREIGN PATENT DOCUMENTS

| | | |
|---|---|---|
| 2448596 | 9/1980 | France . |
| 3143128 | 10/1981 | Germany . |
| 4221295 | 1/1994 | Germany . |
| 2002260 | 2/1979 | United Kingdom . |

OTHER PUBLICATIONS

Patent Abstact of Japanese JP 5156598 dated Jun. 22, 1993.

*Primary Examiner*—Richard Crispino
*Assistant Examiner*—J. A. Lorengo
*Attorney, Agent, or Firm*—Fulbright & Jaworski, LLP

[57] ABSTRACT

A method of transfer printing onto a receptor substrate (16), comprising at least partially covering a first transfer (13) with barrier means (15) located to come between the first transfer (13) and the receptor substrate (16) so that, where the barrier means (15) covers the first transfer (13), transfer material (6) is substantially prevented from being transferred from the first transfer (13) to the receptor substrate (16), and the barrier means (15) is sandwiched between the first transfer (13) and a second transfer (14).

43 Claims, 2 Drawing Sheets

TRANSFER PRINTING METHOD AND APPARATUS

The present invention relates to a method of transfer printing and to apparatus, including transfers, for use in such a method.

In a transfer printing process, a transfer, carrying a transferable or 'transfer' material, is brought into close proximity or contact with the surface of a receptor, and subjected to conditions which cause the transfer material to migrate from the transfer to the receptor. In most such processes, when the transfer material has migrated to the receptor, it becomes permanently bound thereto. Transfers can be prepared by printing or otherwise depositing the chosen transfer material onto a suitable substrate, in a pattern which, when the transfer material migrates to the receptor, is reproduced on the receptor in mirror image.

A particular form of transfer printing, known as sublimation transfer printing, is used to dye textile fabrics, particularly those which include synthetic fibres (such as polyester, polyamide, acrylic, triacetate and acetate fibres), with coloured dyes. In such processes, a textile web is brought into contact with a sublimation transfer, comprising a paper substrate carrying a design printed using an ink loaded with a sublimation dye, at an elevated temperature, typically of between 200 and 220° C., and the dye is caused to sublime and migrate from the paper substrate to the fabric, where it is absorbed and dyes the fabric with a mirror image of the design originally printed onto the transfer. Sublimation transfers can carry substantial blocks of solid colours and, indeed, a single transfer can carry a single colour.

Sublimation transfer printing is particularly suited to dyeing polyesters. Unfortunately, however, the technique suffers from several disadvantages, especially when used to dye large webs of fabric, such as those used to form the surfaces of gaming tables and the like. When large scale sublimation transfers are printed, it is difficult to ensure that the dye carrying inks, which must be individually applied to the transfer substrate, remain in register and that no unwanted areas of overlap or gaps are created between adjacent inked areas. Whenever two differently coloured inks overlap on a transfer, the result is a line of discoloration between adjacent correctly dyed areas on the finished cloth. A gap between inks on a transfer, will result in a white line on the finished fabric.

To prepare sublimation transfers, sublimation dye loaded inks can be printed onto suitable paper substrates using any conventional printing technique, including those which make use of drum or cylinder printing presses. By using such presses, more accurate registration of inked areas can be achieved but, however, the choice of patterns which may be produced in this manner is limited by the cylinder or drum circumference, which rarely exceeds 24 inches. Thus, if it is wished to dye fabric with a pattern having a repeat of greater than 24 inches, using sublimation transfers printed on a cylinder press, a plurality of different such transfers must be printed and joined together in abutment, before the resulting larger sublimation transfer can be used to dye the fabric. Unfortunately, however, each strip of the adhesive tape, which must be employed to join adjacent sublimation transfers, can cause a discoloration in the dyed fabric and any slight gap between adjacent sublimation transfers will result in a white line on the printed fabric.

These difficulties cannot be overcome by deliberately overlapping the edges of adjacent sublimation transfers because the transfers' paper substrates are porous to sublimation dyes and, therefore, a dye from an outer transfer, of a pair of overlapped transfers, will penetrate through to the fabric, during the transfer printing process, mix with the dye from the inner transfer and discolour the fabric. Attempts have been made to resolve this problem by forming sublimation transfers from thicker paper substrates. However, such attempts have met with failure.

The aforementioned difficulties are particularly acute when sublimation printing techniques are employed to print fabrics, such as those used to provide surfaces for gaming tables and the like, with pattern repeats which are longer than the circumference of the cylinders typically found in the cylinder presses used to print sublimation transfers. Up until now, such fabrics have been printed using a complex and exacting technique in which the fabric web is firstly dyed with a background colour, that colour is then bleached out from the areas of the fabric to be dyed a different colour or colours, and the bleached areas are then printed with each of the desired further colours.

In accordance with a first aspect of the present invention, there is provided a method of transfer printing onto a receptor substrate, comprising at least partially covering a first transfer with barrier means located to come between the first transfer and the receptor substrate, wherein, where the barrier means so covers the transfer, transfer material is substantially prevented from transferring from the transfer to the receptor substrate.

Thus, the bleaching step of the previously practiced technique can be avoided. Also and in accordance with the invention, a barrier can be located so as to cover a portion of a first transfer which overlaps a second transfer so that, during transfer printing, transfer material from the first transfer is prevented, by the barrier, from passing through the second transfer and mixing with transfer material from the second transfer on the receptor substrate. By this method, therefore, transfers can be overlapped without causing any discolouration in the dyed cloth, thus allowing fabrics which must be accurately dyed with patterns having long repeats, such as those used to provide the surfaces for gaming tables and the like, to be dyed by transfer printing.

Moreover, and in accordance with the invention, barrier means can be located on the surface of a first transfer carrying a single block of transfer material, so as to produce a pattern in the transfer material transferred to the receptor substrate.

Preferably, the barrier means is sandwiched between the first transfer and a second transfer, and the resulting sandwich is arranged so that the barrier means offers no substantial impediment to transfer material being transferred from the second transfer to the receptor substrate. Thus, a smaller second transfer and equally dimensioned barrier means can be located within the confines of a larger first transfer, and transfer material from the first transfer will not be transferred to the receptor substrate, where material from the second transfer is so transferred. In this way, the inventive method can be used to form multi-coloured patterns with repeats which exceed the circumference of the cylinders typically found in the cylinder presses used to print sublimation transfers. Thus, this preferred embodiment is particularly useful for printing fabrics with multi-coloured patterns having long repeats, such as those used to provide the surfaces for gaming tables and the like.

In an embodiment, the second transfer is at least partially covered with further barrier means located to come between the second transfer and the receptor substrate, wherein, where the further barrier means covers a transfer, transfer material therefrom is substantially prevented from being transferred to the receptor substrate. Preferably, a first transfer and a plurality of barrier means and second transfers are sandwiched together such that, where a barrier means covers a transfer, transfer material therefrom is substantially prevented from being transferred to the receptor substrate.

In preferred arrangements, an absorbent trap means is located between the barrier means or the further barrier means and the transfer or transfers covered thereby, for absorbing transfer material prevented from being transferred to the receptor substrate by the barrier. An advantage of this arrangement is that transfer material, released from a covered transfer during transfer printing, is absorbed and prevented from leaking around the barrier means and into contact with the receptor substrate.

Preferably, the first transfer and the barrier means and, if present, the second transfer and further barrier means are sandwiched together into a laminated transfer and the latter is used to transfer print the receptor substrate. The barrier means can be integrally formed with the or each second transfer. Also, absorbent trap means can be integrally formed with a second transfer.

In an embodiment, the or each second transfer comprises a substrate impervious to transfer material from the first transfer. The or each second transfer can comprise a substrate carrying a first coating which renders the substrate impervious to transfer material from the first transfer. Preferably, the absorbent trap means comprises an absorbent coating applied to the substrate of the second transfer, wherein the absorbent coating can absorb transfer material prevented from transferring to the receptor substrate by the first coating, and the first coating is sandwiched between the substrate and the absorbent coating.

In an embodiment, the barrier means or first coating comprises metal foil, preferably aluminium foil. Alternatively, the barrier means or first coating can comprise a film of plastic material, preferably capable of withstanding temperatures of up to 220° C., without distorting.

In preferred embodiments, the or each transfer is a sublimation transfer and the transfer material is a sublimation ink, dyestuff or the like. Preferably, the or each transfer comprises a substrate carrying a sublimation ink, dyestuff or the like, and at least one transfer can comprise a substrate carrying a plurality of different sublimation inks, dyestuffs or like materials.

In further preferred embodiments, the or each transfer comprises a paper or like substrate and the first coating can be formed from a resin with poor sublimation dye or ink release properties, and is preferably a phenolic resin. The phenolic resin, preferably, has a melting point in excess of 130° C., preferably over 138° C. and most preferably of 150° C. or above. The resin can be modified by the addition of a tackifying agent and, most preferably, the phenolic resin is a rosin modified phenolic resin. The phenolic resin should be selected so as to resist bubbling when heated to a temperature in the range 200–220° C.

Where an absorbent coating is present, it is preferably formed from a polyester resin. The preferred receptor substrate is a textile material, which, preferably, includes synthetic fibres, such as polyester, polyamide, acrylic, triacetate or acetate fibres, and most preferably comprises polyester fibres.

The transfer or transfers can be prepared by printing, preferably by lithographic, flexographic or screen processes using conventional equipment, including cylinder printing presses. In embodiments, at least two second transfers can overlap the first transfer.

In a second aspect, the present invention provides a foliate article for use in a transfer printing process, comprising a coated paper or like porous substrate, wherein a first coating renders the substrate impervious to a transfer material when the foliate article is used in a transfer printing process, between a transfer and a receptor substrate.

By including a porous substrate, foliate articles in accordance with this aspect of the invention are able to accept and carry inks, dyestuffs and like materials of the type employed in the manufacture of transfers used in transfer printing processes. Therefore, not only can such articles be used directly as barrier means in transfer printing methods in accordance with the first aspect of the invention, but also, once coated with suitable ink, dyestuff or like material (preferably applied to the opposite side of the article from the first coating), they are usable as transfers in such processes. When used as such, a foliate article in accordance with the invention functions as a combined transfer and barrier means, in which the barrier means is automatically dimensioned to cover only that part of an adjacent transfer overlapped thereby.

Preferably, a coating of absorbent material, for absorbing transfer material, is formed on the first coating. In embodiments, the first coating comprises a material impervious to the passage of a sublimation ink, dyestuff or the like. Preferably, the first coating comprises a resin with poor sublimation ink, or dyestuff release properties and, preferably, is a phenolic resin having the properties hereinbefore discussed. The absorbent material, preferably, is a polyester resin.

In preferred embodiments, the substrate of the foliate article carries a transfer material. The first and absorbent coatings, preferably, are formed on a first side of the substrate and the transfer material is coated on the opposing side of the substrate. The transfer material, in preferred embodiments, is a sublimation ink, dyestuff or the like.

In most preferred embodiments, the foliate is arranged to be suitable for use as barrier means, combined barrier means and absorbent trap means, or a second transfer in a method of transfer printing in accordance with the first aspect of the invention.

In a third aspect, the invention relates to a transfer for use in a method of transfer printing, comprising a foliate substrate carrying a transfer material, wherein the transfer material is selected to be transferable to a receptor substrate in a fluid state, preferably as a sublimate, and the foliate substrate is impervious to the transfer material.

Advantageously, such a transfer can be employed as a combined barrier means and second transfer in a method of transfer printing in accordance with the first aspect of the invention. When used as such, the transfer provides a barrier means which, advantageously, is always dimensioned to cover only that part of an adjacent first transfer which is covered thereby.

In embodiments, the transfer material is a sublimation ink, dyestuff or like material and, preferably, the transfer's substrate is a foliate article in accordance with the second aspect of the invention. When so, it is preferred that absorbent and impervious coatings are formed on a first side of the substrate and the transfer material is carried on the opposing side of the substrate.

In a further aspect, the present invention provides a laminated transfer comprising a combined barrier means and transfer suitable for use in a method in accordance with the first aspect if the invention. Preferably, the laminated transfer comprises a substrate carrying a coating rendering the substrate impervious to transfer material. In a preferred embodiment, the substrate carries a further coating for absorbing transfer material.

In further aspects, the invention provides printed products produced by a method of transfer printing in accordance with the invention, or a method which employs a foliate article, transfer or laminated transfer, in accordance with the invention. Preferably, the printed product is a textile article.

Specific embodiments if the invention will now be described by way of example only and with reference to the following drawings.

Figure 3:
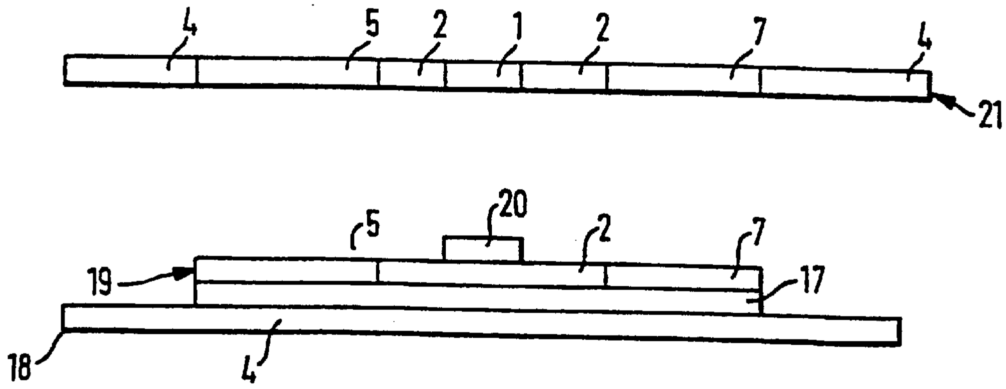
Figure 4:
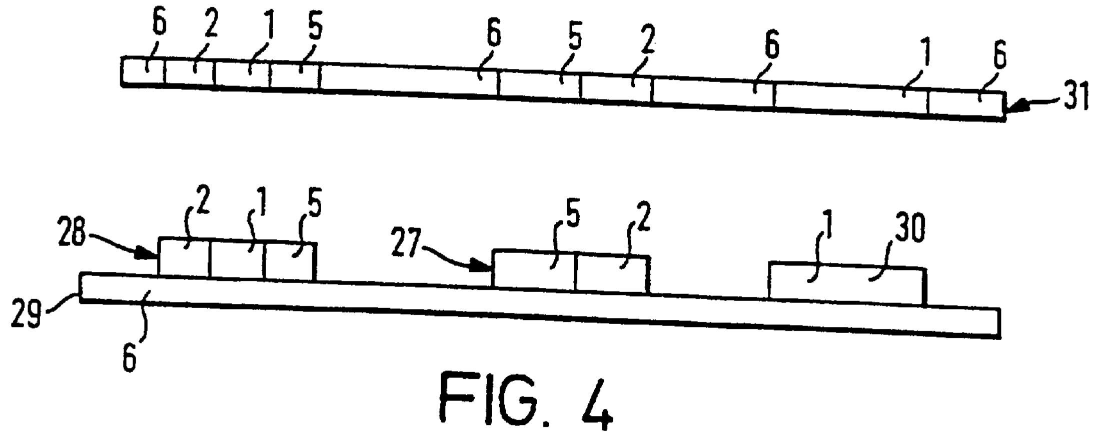
Figure 5:
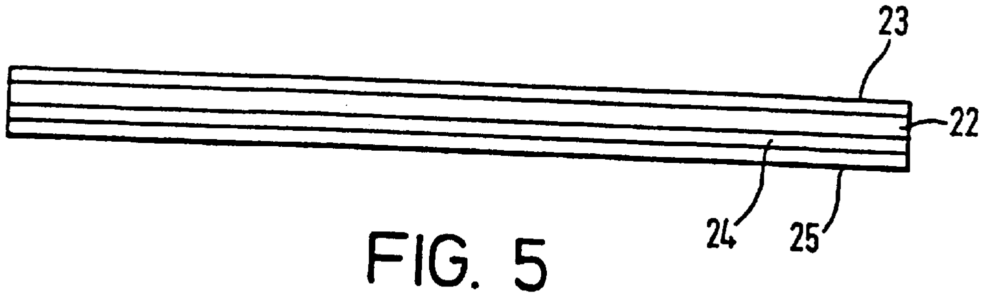

FIG. 3. is a sectional illustration of the use of a second laminate of sublimation transfers in accordance with the invention;

FIG. 4. is a sectional illustration of the use of a third laminate of sublimation transfers in accordance with the invention; and FIG. 5. is a sectional illustration of a sublimation transfer in accordance with the invention.

In all of FIGS. 1–5, the thickness of the transfers, coatings and textile articles have been exagerated for ease of identification.

As stated above, sublimation transfer printing is used to dye textile fabrics, preferably polyester based fabrics, with coloured dyes.

In such processes, a textile web is brought into contact with a transfer, carrying a design printed using ink loaded with sublimation dye, at an elevated temperature, and the dye or dyes are caused to sublime and migrate from the transfer to the fabric, so as to dye the latter.

Smaller webs of fabric can be printed using flat bed heat transfer presses, in which the web of fabric is placed on a flat bed or platen, a previously prepared sublimation transfer is then placed on top of the fabric and a pressure pad is brought down onto the transfer, sandwiching the fabric between the transfer and the platen. The press is heated to a temperature of about 210° C. and the dye carried by the transfer is caused to sublime and migrate into the cloth so that the latter is dyed with a mirror image of the design, originally printed on the transfer. Suitable heat transfer presses include those manufactured by Hix Corporation, of 1201E 27th Street, Pittsburg, Kans. 66762, United States of America, under their trademark Hix Premier. Others include those available under the mark BETA from A. Adkins & Sons Limited, of Park Works, Park Road, South Wigston, Leicester LE18 4QD, England.

Larger or continuous webs of fabric can be dyed using cylinder type heat transfer printing machines, in which a transfer, comprising a web of paper printed with ink loaded with sublimation dye, is sandwiched together with a web of cloth and passed, around a heated cylinder or drum with the transfer sandwiched between the cylinder and the fabric. As the transfer and fabric pass over the heated cylinder, the dye carried by the transfer is caused to sublime and migrate into and dye the cloth. Suitable such textile transfer printing machines include those manufactured and distributed by Bates Textile Machine Co. (Leicestershire) Limited, Harding Street, Leicester, LE1 4DH, England. Such machines include model Nos. MTP 36, MTP 66, BTP 72, BTP 80, STP 80 and HTP 80.

In all such processes, the dye is caused to transfer or migrate into the fabric in register, so as to form a mirror image of the image originally carried by the transfer, in the fabric.

Sublimation transfers themselves are prepared by conventional printing techniques, including lithographic, flexographic and screen printing methods, wherein inks comprising sublimation transfer dyes are printed onto a suitable paper web. Suitable sublimation transfer dyes may be obtained from Holiday Dyes & Chemicals Limited, PO Box B22, Leeds Road, Huddersfield, HD2 1UH, England, and include, inter alia, Sublaprint Yellow 70069, Disperse Yellow 54; Sublaprint Red 70011, Disperse Red 60; Sublaprint Blue 70032, Disperse Blue 359; Sublaprint Orange 70040, Disperse Orange 25; and Sublaprint Black 70065. To prepare an ink suitable for lithographic printing, the selected dye should be mixed with an alkyd varnish and a quick setting lithographic varnish, and the resulting mixture should then be milled to have a maximum particle size of 5 μm, in a roller, bead or rod mill. A suitable alkyd varnish is Terlon 3 and a suitable lithographic varnish is LU2913, both of which are available from Lawter International Ltd., of Murdock Road, Bicester, Oxfordshire OX6 7PN, England. This concentrated ink can be reduced with a varnish made up from an ethyl cellulose resin dissolved in a hydrocarbon solvent which, preferably, also includes a surfactant, to enable it to be used in screen printing techniques. Suitable ethyl cellulose resins include those available under Registered Trade Mark AQUALON, including grades EHEC and N7, from Aqualon (UK) Ltd or Hercules Resins Ltd., of Langby Road, Pendlebury, Salford M6 6JU, England. Suitable hydrocarbon solvents include, ShellSol A, ShellSol R and Cyclohexanone, all of which are available from Hays Chemical Distribution Ltd., of King Street, Garston, Liverpool L19 8EG, England. Suitable surfactants include those silicone compounds conventionally used to aid rub resistance in screen printing. Suitable paper webs, for forming sublimation transfers, include those available under the trademark Huntsman Velvet from Robert Horne, the preferred grades being 90 and 100 gsm.

Figure 1:
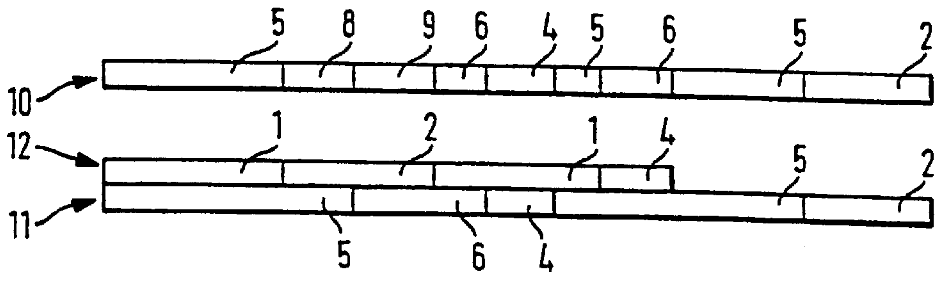
FIG. 1 is a sectional illustration of the use of a laminate of two conventional paper sublimation transfers.

If two adjacent convectional sublimation transfers overlap, or an attempt is made to produce a large scale design by forming a laminate of two or more conventional paper transfers, those areas of the fabric which, when printed, were in registrar with overlapped transfers, will receive a mixture of the dyes carried by the transfers in the area over overlap. FIG. 1 shows the results of printing a fabric 10 with a laminate of first (outer) 11 and second (inner) 12 conventional paper sublimation transfers, in a heat transfer press. In FIG. 1 and in the subsequent illustrations, the colours printed on the transfers and dyed into the fabric are identified in accordance with the following scheme:

| Reference numeral | Colour |
|---|---|
| 1 | No dye (white) |
| 2 | Red |
| 3 | Black |
| 4 | Purple |
| 5 | Yellow |
| 6 | Green |
| 7 | Blue |
| 8 | Orange |
| 9 | Brown |

Thus, it can be seen from FIG. 1 that, when the outer transfer 11 (as applied to the fabric in the press) is coloured yellow 5, and the inner transfer 12 is undyed, the fabric 10 is dyed yellow 5; whereas, where the inner transfer 11 is printed red 2 and the outer transfer 12 is printed yellow 5 and green 6, the fabric 10 is dyed orange 8 and brown 9 respectively. Where the inner transfer 12 carries a purple dye 4 and the outer transfer 11 carries a yellow dye 5, the cloth is dyed green as a result of the purple dye 4 becoming contaminated with yellow dye 5.

Figure 2:
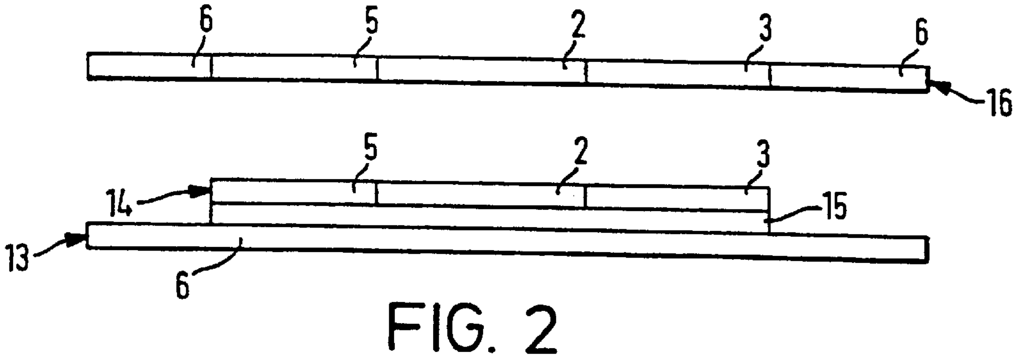
FIG. 2 is a sectional illustration of the use of a laminate of sublimation transfers in accordance with the invention.

In a first embodiment of the invention, as illustrated in FIG. 2, first and second transfers 13 and 14 are prepared, in a conventional manner, by printing sublimation dye carrying inks of the numbered colours onto paper webs. A sheet of aluminium foil 15 is then applied to the back, unprinted, side of the second transfer 14, using an adhesive (for example 3M Spray Mount) that will withstand temperatures in excess of 220° C. The laminated foil 15 and second transfer 14 can then be cut into the required shape and then fixed to the printed surface of the first printed transfer 13, using the same adhesive, to provide a laminated transfer in which the aluminium foil 15 is sandwiched between the first and second transfers 13 and 14. The first transfer 13 is larger than the second transfer 14 and, when assembled as aforesaid, the second transfer 14 and foil only partially cover the first transfer 13.

The complete laminated transfer, as shown in FIG. 2, can be employed to print onto fabric using a flat bed heat transfer press. The image, provided by the first transfer 13, should be relatively small and, preferably no more than 3–4 inches across, in order to avoid any difficulties which may arise as a result of expansion of the foil during the printing process. When applied to a fabric in this way, the transfers 13 and 14 will dye a fabric 16 as shown in FIG. 2, that is to say, the colours carried by the second transfer 14 will be produced in register on the fabric 16 with dye carried by the first transfer 13 only migrating to the fabric 16, where it is not covered by the second transfer 14 and foil 15.

Clearly, the process is not limited to the dyes and transfer dimensions shown in FIG. 2, or to a laminate of just two transfers and one foil. Different coloured dyes may be employed, and additional transfers and foils may be laminated together with the first and second transfers 13 and 14 and foil 15.

In a second arrangement in accordance with the invention, a plastic material capable of withstanding 220° C. without distorting, such as mellinex (as available from I.C.I.), can be substituted for the aluminium foil 15. The advantage of this arrangement is that the plastic film or sheet can be reused a few times.

FIG. 3 shows a laminated transfer in which a sheet of mellinex 17 is sandwiched between a first paper transfer 18 and a second paper transfer 19, both printed with sublimation inks carrying dyes in the indicated colours, with a second mellinex sheet 20 bonded to the surface of the second transfer 19, as shown. The resulting laminated transfer can be used on a flat bed heat transfer press and, when so used, will dye a fabric web 21 with the colours shown in FIG. 3. The mellinex sheets 17 and 20 are bonded to the paper transfers 17 and 19 with 3M Spray Mount.

A third embodiment of the invention involves the use of pre-coated paper to form sublimation transfers. Paper suitable for manufacturing sublimation transfers is firstly coated with a solution of a phenolic resin, or a modified phenolic resin, dissolved in a solvent comprising aliphatic hydrocarbons and a slow evaporating ketone, either by screen printing, or by roller coating. The coating is applied through a 90 T mesh, to give a thickness of 25–30 microns, and is then dried in blown heated air. The phenolic resin employed is selected so as to be able to withstand temperatures in excess of 200° C. and, preferably, 220° C., without bubbling. It is important that plasticizers are not included in this coating as, otherwise, the sharpness of any resulting image can be affected. The resin also, should have a very poor sublimation dye release capability, as it is this property which has been shown to inhibit dye penetration through the paper. A rosin modified phenolic resin suitable for use in the present invention is Mitchanol 32, available from Mitchanol International Ltd., of Hallowfield way, Church Road, Mitcham, Surrey CR4 3YE, England.

Once this coating has dried, a second coating, this time of a polyester resin, as available from Coates Screen Inks, is applied to the same side of the paper as the phenolic resin. This second coating serves as an absorbent trap for dye released from an adjacent sublimation transfer, when the coated paper is used to cover such a transfer in a sublimation transfer printing process.

Paper coated in the aforementioned manner can be printed with inks loaded with sublimation transfer dyes so as to provide transfers in which the coatings form integrated barrier and absorbent trap layers. The sublimation dye containing inks, however, should be printed on the uncoated side of the paper web. The arrangement of coatings and printed ink should be as shown in FIG. 5, in which the paper web is shown at 22, the sublimation dyes at 23, the coating of phenolic resin at 24 and the coating of polyester at 25.

Transfers of the type illustrated in FIG. 5, or unprinted sheets of paper coated with resins in the aforementioned manner, can be used to form laminated sublimation transfers. An exemplary arrangement is shown in FIG. 4, in which two second transfers 28 and 27, formed as shown in FIG. 5, are cut to shape and bonded to a first transfer 29, along with an unprinted sheet of resin coated paper 30, which carries no sublimation dye. The first transfer 28 need not, itself, be printed on coated paper, although the possibility is not excluded. The resulting laminated transfer can be used in either a flat bed or cylinder type heat transfer printing machine to produce an image on a fabric 30 as shown in FIG. 4.

It is preferred that all of the dyes used for making the ink employed to print the sublimation transfers should be of a 'C' rating, that is to say capable of penetrating a single layer of paper.

The last described method can be used to produce patterns with repeats well in excess of the circumference of the cylinder used to print any of the transfers used, by appropriately printing and cutting second transfers and bonding them to a first transfer printed with a block colour, as shown in FIG. 4.

What is claimed is:

1. A method of transfer printing onto a receptor substrate, comprising at least partially covering a first transfer with barrier means located to come between the first transfer and the receptor substrate, wherein, where the barrier means so covers the first transfer, transfer material is substantially prevented from being transferred from the first transfer to the receptor substrate, wherein a second transfer comprising a substrate impervious to transfer material from the first transfer provides the barrier means.

2. The method of claim 1, comprising at least partially covering the second transfer with further barrier means located to come between the second transfer and the receptor substrate, wherein, where the further barrier means covers a transfer, transfer material therefrom is substantially prevented from being transferred to the receptor substrate.

3. The method of claim 1, wherein an absorbent trap means is located between the barrier means or the further barrier means and the transfer or transfers covered thereby, for absorbing transfer material prevented from being transferred to the receptor substrate by said barrier means.

4. The method of claim 1, wherein the first transfer and the second transfer are sandwiched together into a laminated transfer.

5. The method of claim 4, wherein a barrier means is sandwiched together with said first transfer and said second transfer to form a laminated transfer and said barrier means is used to transfer part print to the receptor substrate.

6. The method as claimed in claim 3, wherein said absorbent trap means is integrally formed with the second transfer.

7. The method of claim 1, wherein said second transfer comprises a substrate carrying a first coating which renders the substrate impervious to transfer material from the first transfer.

8. The method of claim 7, wherein said second transfer is a foliate article or a transfer.

9. The method of claim 6, wherein said absorbent trap means comprises an absorbent coating applied to the substrate of the second transfer for absorbing transfer material prevented from transferring to the receptor substrate by the first coating.

10. The method of claim 9, wherein said first coating is sandwiched between the substrate and the absorbent coating.

11. The method of clam 1, wherein at least one of said barrier means and said first coating comprises a member selected from the group consisting of metal foil and plastic film material.

12. The method of claim 1, wherein at least one of said barrier means and said first coating comprises aluminum foil.

13. The method of claim 1, wherein at least one of said barrier means and said first coating comprises a plastic film material capable of withstanding temperatures of up to 220° C. without distorting.

14. The method of claim 1, wherein at least one of said first and said second transfer is a sublimation transfer comprising a substrate carrying at least one member selected from the group consisting of a sublimation ink and a dyestuff.

15. The method of claim 14, wherein said at least one transfer comprises a substrate carrying a plurality of sublimation inks or dyestuffs.

16. The method of claim 1, wherein each of said first transfer and said second transfer comprises a paper.

17. The method of claim 7, wherein said first coating comprises a resin with poor sublimation dye or ink release properties.

18. The method of claim 17, wherein said resin is a phenolic resin.

19. The method of claim 9, wherein said absorbent coating is a polyester resin.

20. The method of claim 1, wherein the receptor substrate is a textile material.

21. The method of claim 20, wherein said textile material comprises polyester fibers.

22. The method of claim 1, wherein said transfer is prepared by printing.

23. The method of claim 22, wherein said printing is selected from the group consisting of lithographic, flexographic and a screen process.

24. The method of claim 1, wherein said first transfer and a plurality of second transfers are sandwiched together such that, where barrier means cover a transfer, transfer material therefrom is substantially prevented from being transferred to the receptor substrate.

25. The method of claim 1, wherein at least two second transfers cover the first transfer.

26. A foliate article comprising:

a porous substrate;

a first coating applied to said porous substrate, said first coating rendering said substrate impervious to a transfer material when the foliate article is used in a transfer printing process between a transfer and a receptor substrate; and a coating of absorbent material for absorbing transfer material formed on the first coating.

27. The foliate article of claim 26, wherein said first coating comprises a material impervious to the passage of at least one of a sublimation ink or dyestuff.

28. The foliate article of claim 26, wherein said first coating comprises a resin with poor sublimation ink or dyestuff release properties.

29. The foliate article of claim 26, wherein said resin is a phenolic resin.

30. The foliate article of claim 26, wherein said absorbent material is a polyester resin.

31. The foliate article of claim 26, wherein said substrate carries a transfer material.

32. The foliate article of claim 31, wherein said first coating and said absorbent coating are applied to a first side of the substrate and said transfer material is coated on the opposing side of said substrate.

33. The foliate article of claim 31, wherein said transfer material is a member selected from the group consisting of a sublimation ink and a dyestuff.

34. A transfer comprising:

a foliate substrate, said foliate substrate carrying a transfer material, wherein said transfer material is transferable to a receptor substrate in a fluid state and said foliate substrate is impervious to said transfer material; and an impervious coating on a first side of said foliate substrate and said transfer material is carried on the opposing side of said foliate substrate.

35. The transfer of claim 34, wherein said transfer material is transferable as a sublimate.

36. The transfer of claim 35, wherein said transfer material is selected from the group consisting of a sublimation ink and a dyestuff.

37. The transfer of claim 34, wherein said substrate is a foliate article comprising a porous substrate;

a first coating on said substrate, wherein said first coating renders said substrate impervious to a transfer material when the foliate article is used in a transfer printing process between a transfer and a receptor substrate; and a coating of absorbent material for absorbing transfer material formed on the first coating.

38. The transfer of claim 37, wherein absorbent and impervious coatings are formed on a first side of said substrate and said transfer material is carried on the opposing side of said substrate.

39. A laminated transfer comprising a laminate of a first transfer and a second transfer, wherein said second transfer comprises a substrate impervious to transfer material from said first transfer.

40. The laminated transfer of claim 39, comprising a substrate carrying a coating rendering the substrate impervious to transfer material.

41. The laminated transfer of claim 40, wherein said substrate comprises a further coating for absorbing transfer material.

42. The laminated transfer of claim 39, wherein the second transfer comprises a foliate article comprising a porous substrate;

a first coating, said first coating being applied to said substrate and rendering said substrate impervious to a transfer material when the foliate article is used in a transfer printing process between a transfer and a receptor substrate; and a coating of absorbent material for absorbing transfer material formed on the first coating.

43. The laminated transfer of claim 39, wherein said second transfer comprises a transfer comprising a laminate of a first transfer and a second transfer, wherein said second transfer comprises a substrate impervious to transfer material from said first transfer.

* * * * *